(12) United States Patent
Pal et al.

(10) Patent No.: US 10,443,388 B2
(45) Date of Patent: Oct. 15, 2019

(54) HEAT PIPE SYSTEM FOR ENGINE ROTOR COOLING

(71) Applicant: Hamilton Sundstrand Corporation, Charlotte, NC (US)

(72) Inventors: Debabrata Pal, Hoffman Estates, IL (US); Huazhen Chai, Caledonia, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 321 days.

(21) Appl. No.: 15/389,937

(22) Filed: Dec. 23, 2016

(65) Prior Publication Data

US 2018/0179896 A1  Jun. 28, 2018

(51) Int. Cl.
*F01D 5/08* (2006.01)
*F01D 19/00* (2006.01)

(52) U.S. Cl.
CPC ............ *F01D 5/085* (2013.01); *F01D 19/00* (2013.01); *F05D 2260/208* (2013.01)

(58) Field of Classification Search
CPC ..... F01D 5/085; F01D 19/00; F05D 2260/208
See application file for complete search history.

(56) References Cited

U.S. PATENT DOCUMENTS

| 7,114,915 | B2 | 10/2006 | Uematsu et al. | |
| 2009/0120099 | A1* | 5/2009 | Brand | F01D 25/02 60/785 |
| 2014/0165570 | A1* | 6/2014 | Herring | F02C 7/14 60/730 |
| 2016/0108756 | A1 | 4/2016 | Farkas et al. | |

FOREIGN PATENT DOCUMENTS

GB  2117842  10/1983
JP  H11117810  4/1999

* cited by examiner

*Primary Examiner* — Jacob M Amick
*Assistant Examiner* — Charles Brauch
(74) *Attorney, Agent, or Firm* — Cantor Colburn LLP

(57) ABSTRACT

A heat pipe system includes one or more arcuate heat pipe segments shaped conforming to an inner wall of an engine rotor. The heat pipe system also includes a heat pipe fluid within the one or more arcuate heat pipe segments.

20 Claims, 5 Drawing Sheets

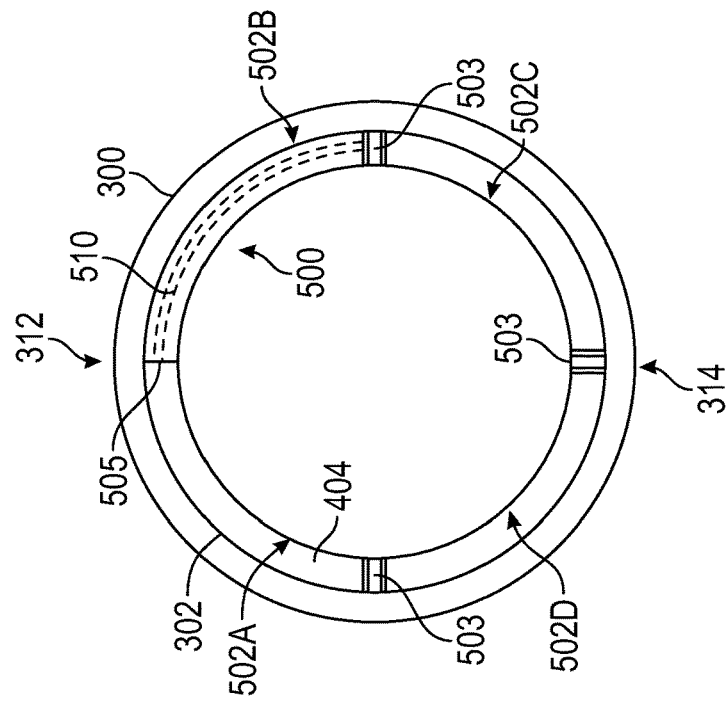
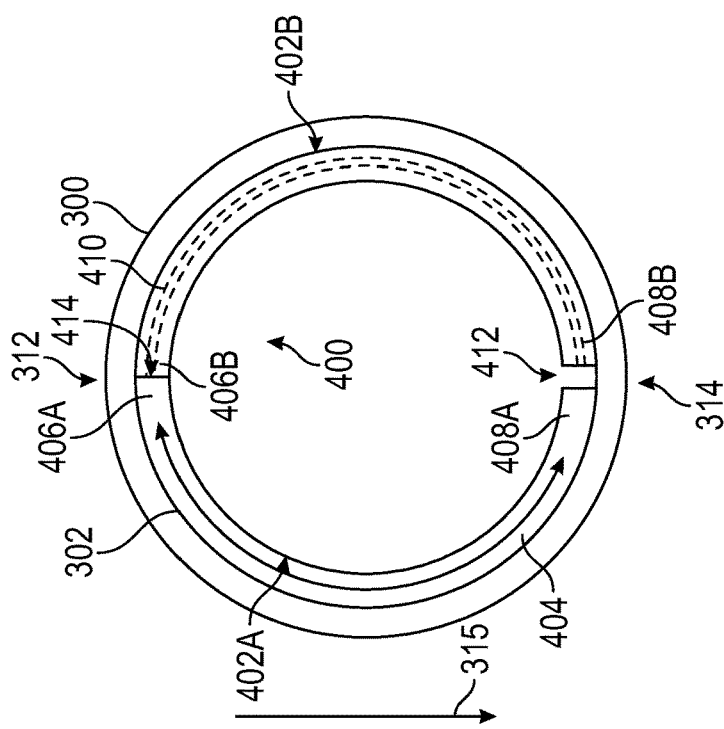

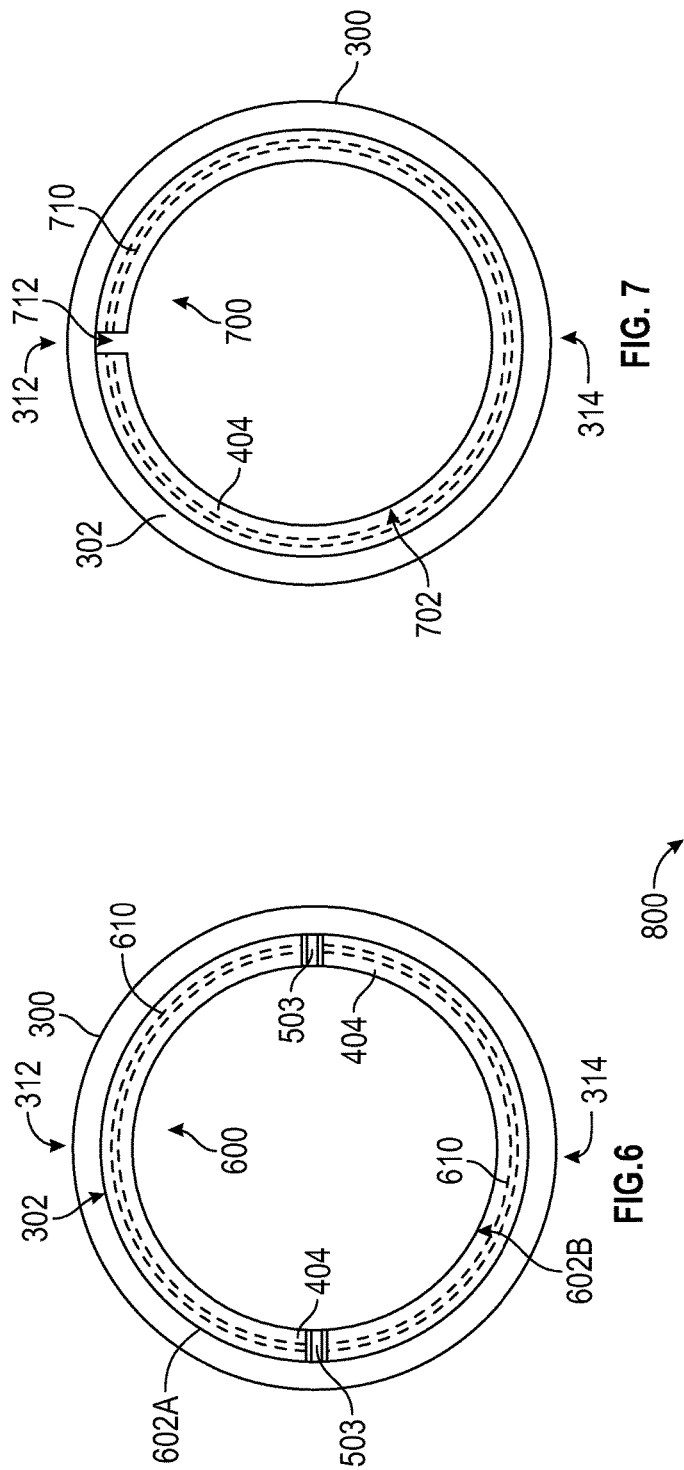

HEAT PIPE SYSTEM FOR ENGINE ROTOR COOLING

BACKGROUND

This disclosure relates to gas turbine engines, and more particularly to a heat pipe system for gas turbine engine rotor cooling.

Gas turbine engines are used in numerous applications, one of which is for providing thrust to an airplane. When the gas turbine engine of an airplane has been shut off for example, after the airplane has landed at an airport, the engine is hot and due to heat rise, the upper portions of the engine will be hotter than lower portions of the engine. When this occurs thermal expansion may cause deflection of components of the engine which can result in a "bowed rotor" condition. If a gas turbine engine is in such a bowed rotor condition, it is undesirable to restart or start the engine.

One approach to mitigating a bowed rotor condition is to use a starter system to drive rotation (i.e., cool-down motoring) of a spool within the engine for an extended period of time at a speed below which a resonance occurs (i.e., a critical speed or frequency) that may lead to damage when a sufficiently large bowed rotor condition is present. This process can delay engine starting and may lead to premature starter system wear. Other approaches to engine rotation to alleviate a bowed rotor condition have been contemplated, but such approaches can also delay engine starting and/or require use of an energy source.

BRIEF DESCRIPTION

In an embodiment, a heat pipe system includes one or more arcuate heat pipe segments shaped conforming to an inner wall of an engine rotor. The heat pipe system also includes a heat pipe fluid within the one or more arcuate heat pipe segments.

In addition to one or more of the features described above, or as an alternative to any of the foregoing embodiments, further embodiments may include where an expansion gap is formed between two ends of the one or more arcuate heat pipe segments.

In addition to one or more of the features described above, or as an alternative to any of the foregoing embodiments, further embodiments may include a thermally conductive interface between at least two ends of the one or more arcuate heat pipe segments.

In addition to one or more of the features described above, or as an alternative to any of the foregoing embodiments, further embodiments may include where the heat pipe system is bonded to the inner wall of the engine rotor.

In addition to one or more of the features described above, or as an alternative to any of the foregoing embodiments, further embodiments may include where the heat pipe fluid is in an evaporated state during engine operation and transitions to at least a partially liquid state in response to temperature non-uniformity after engine shutdown.

In addition to one or more of the features described above, or as an alternative to any of the foregoing embodiments, further embodiments may include where at least two ends of the one or more arcuate heat pipe segments directly contact each other.

In addition to one or more of the features described above, or as an alternative to any of the foregoing embodiments, further embodiments may include where each of the one or more arcuate heat pipe segments extends axially along the inner wall of the engine rotor proximate to a high compressor engine section.

In an embodiment, a gas turbine engine includes a high pressure spool including a high pressure compressor coupled to a high pressure turbine via a high pressure shaft. The gas turbine engine also includes a low pressure spool including a low pressure compressor coupled to a low pressure turbine via a low pressure shaft concentrically arranged within the high pressure shaft. The gas turbine engine also includes a heat pipe system including one or more arcuate heat pipe segments shaped conforming to an inner wall of the low pressure shaft, where a heat pipe fluid within the one or more arcuate heat pipe segments establishes a thermal communication path from an upper portion of the high pressure spool through the low pressure spool to a lower portion of the high pressure spool.

In addition to one or more of the features described above, or as an alternative to any of the foregoing embodiments, further embodiments may include where each of the one or more arcuate heat pipe segments extends axially along the inner wall of the low pressure shaft proximate to the high pressure compressor.

In an embodiment, a method includes forming a heat pipe system including one or more arcuate heat pipe segments shaped conforming to an inner wall of an engine rotor. The method also includes bonding the one or more arcuate heat pipe segments to the inner wall of the engine rotor.

In addition to one or more of the features described above, or as an alternative to any of the foregoing embodiments, further embodiments may include forming an expansion gap between two ends of the one or more arcuate heat pipe segments.

In addition to one or more of the features described above, or as an alternative to any of the foregoing embodiments, further embodiments may include forming a thermally conductive interface between at least two ends of the one or more arcuate heat pipe segments.

In addition to one or more of the features described above, or as an alternative to any of the foregoing embodiments, further embodiments may include filling the one or more arcuate heat pipe segments with a heat pipe fluid that is in an evaporated state during engine operation and transitions to at least a partially liquid state in response to temperature non-uniformity after engine shutdown.

In addition to one or more of the features described above, or as an alternative to any of the foregoing embodiments, further embodiments may include positioning at least two ends of the one or more arcuate heat pipe segments directly contact each other.

A technical effect of the systems, apparatuses, and methods is achieved by using a heat pipe system for engine rotor cooling to prevent/reduce a bowed rotor condition in an engine as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 4 depicts arcuate heat pipe segments conforming to an inner wall of an engine rotor according to an embodiment;

FIG. 5 depicts arcuate heat pipe segments with thermally conductive interfaces and an inner wall of an engine rotor according to an embodiment;

FIG. 6 depicts arcuate heat pipe segments with thermally conductive interfaces and an inner wall of an engine rotor according to an embodiment;

FIG. 7 depicts a single arcuate heat pipe segment conforming to an inner wall of an engine rotor according to an embodiment; and FIG. 8 is a flow chart illustrating a method in accordance with an embodiment of the disclosure.

DETAILED DESCRIPTION

Various embodiments of the present disclosure are related to bowed rotor start prevention/reduction in a gas turbine engine by using one or more heat pipe systems. Embodiments can include one or more arcuate heat pipe segments shaped conforming to an inner wall of an engine rotor to communicate heat from an upper rotor portion to a lower rotor portion after engine shutdown. A heat pipe fluid within the one or more arcuate heat pipe segments can be in an evaporated state during engine operation and transitions to at least a partially liquid state in response to temperature non-uniformity after engine shutdown. The heat pipe system or systems increase temperature uniformity to reduce or prevent a bowed rotor condition in the engine once engine rotation halts.

Figure 1:
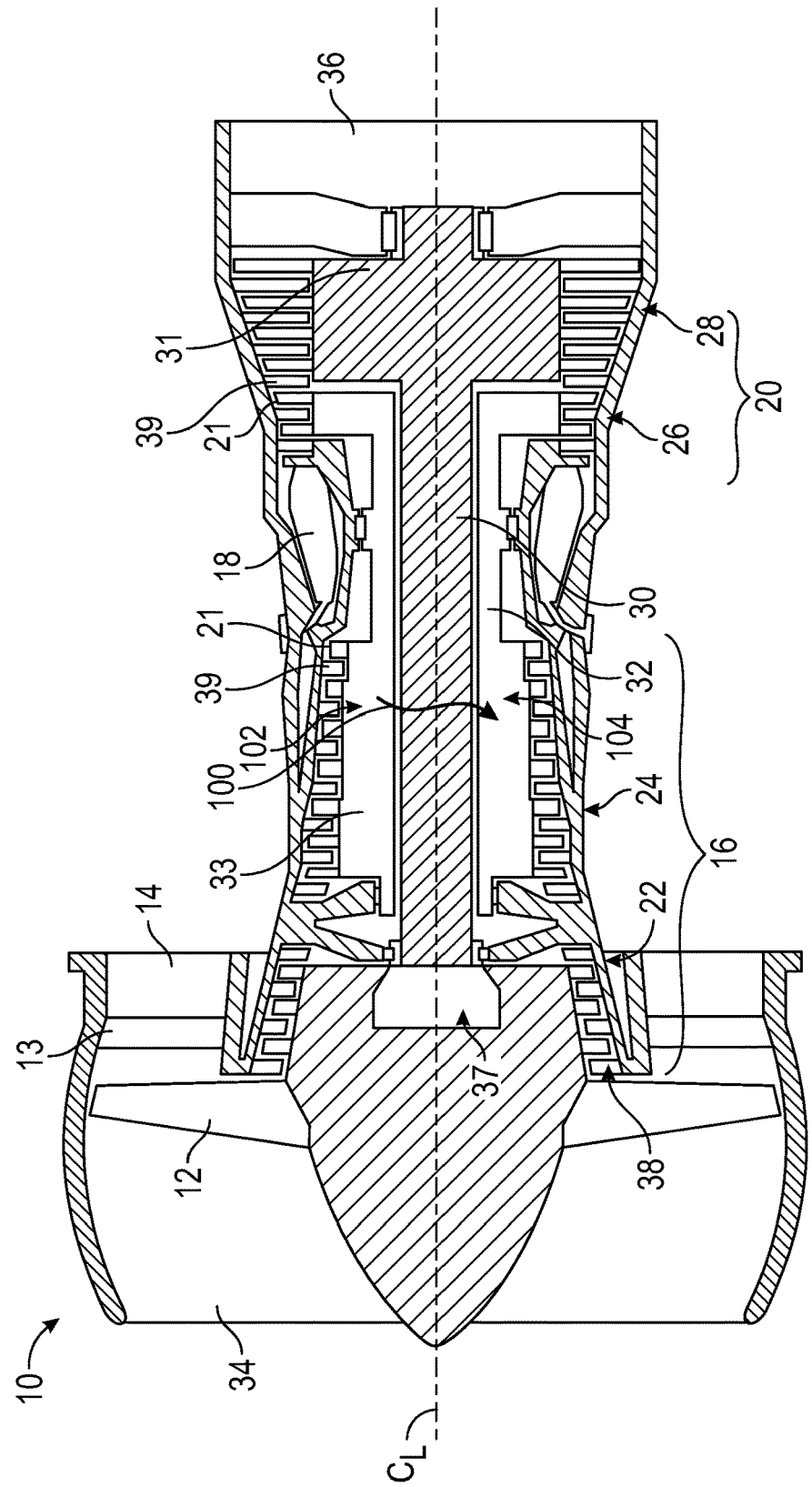
FIG. 1 is a cross-sectional view of a gas turbine engine.

Referring now to FIG. 1, a cross-sectional view of a gas turbine engine 10, in a turbofan configuration is illustrated. The illustrated gas turbine engine 10 includes a propulsion fan 12 mounted inside a bypass duct 14 upstream of a fan exit guide vane 13. A power core of the engine is formed by a compressor section 16, a combustor 18 and a turbine section 20. Rotor blades (or airfoils) 21 in the compressor section 16 and/or the turbine section 20 are arranged in stages 38 with corresponding stator vane airfoils 39.

In the two-spool, high bypass configuration of FIG. 1, compressor section 16 includes a low pressure compressor 22 (a lower pressure compressor section) and a high pressure compressor 24 (a highest pressure compressor section). The turbine section 20 includes high a pressure turbine 26 and a low pressure turbine 28.

The low pressure compressor 22 is rotationally coupled to the low pressure turbine 28 via a low pressure shaft 30, thereby forming the low pressure spool or low spool 31. High pressure compressor 24 is rotationally coupled to the high pressure turbine 26 via a high pressure shaft 32, forming the high pressure spool or high spool 33. The low pressure shaft 30 can be concentrically arranged within the high pressure shaft 32 about centerline ($C_L$).

During operation of the gas turbine engine 10, the fan 12 accelerates air flow from an inlet 34 through bypass duct 14, generating thrust. The core airflow is compressed in the low pressure compressor 22 and the high pressure compressor 24 and then the compressed airflow is mixed with fuel in the combustor 18 and ignited to generate combustion gas.

The combustion gas expands to drive the high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow. In advanced turbofan designs with a low pressure turbine and a high pressure turbine, the low pressure shaft 30 may be coupled to a low pressure compressor and then to a fan 12 via geared drive mechanism 37, providing improved fan speed control for increased efficiency and reduced engine noise. Propulsion fan 12 may also function as a first-stage compressor for gas turbine engine 10, with low pressure compressor 22 performing as an intermediate-stage compressor or booster in front of the high pressure compressor. Alternatively, the low pressure compressor stages are absent, and air from fan 12 is provided directly to high pressure compressor 24, or to an independently rotating intermediate compressor spool.

The gas turbine engine 10 may have a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or un-ducted propeller engine, or an industrial gas turbine.

As further described herein, one or more heat pipe systems (e.g., of FIGS. 3-7) can establish a thermal communication path 100 from an upper portion 102 of the high pressure spool 33 through the low pressure spool 31 to a lower portion 104 of the high pressure spool 33. Coupling one or more heat pipe systems within the low pressure shaft 30 enhances thermal communication between upper portion 102 and the lower portion 104 of the high pressure spool 33, thereby reducing bowing effects due to thermal differences.

Figure 2:
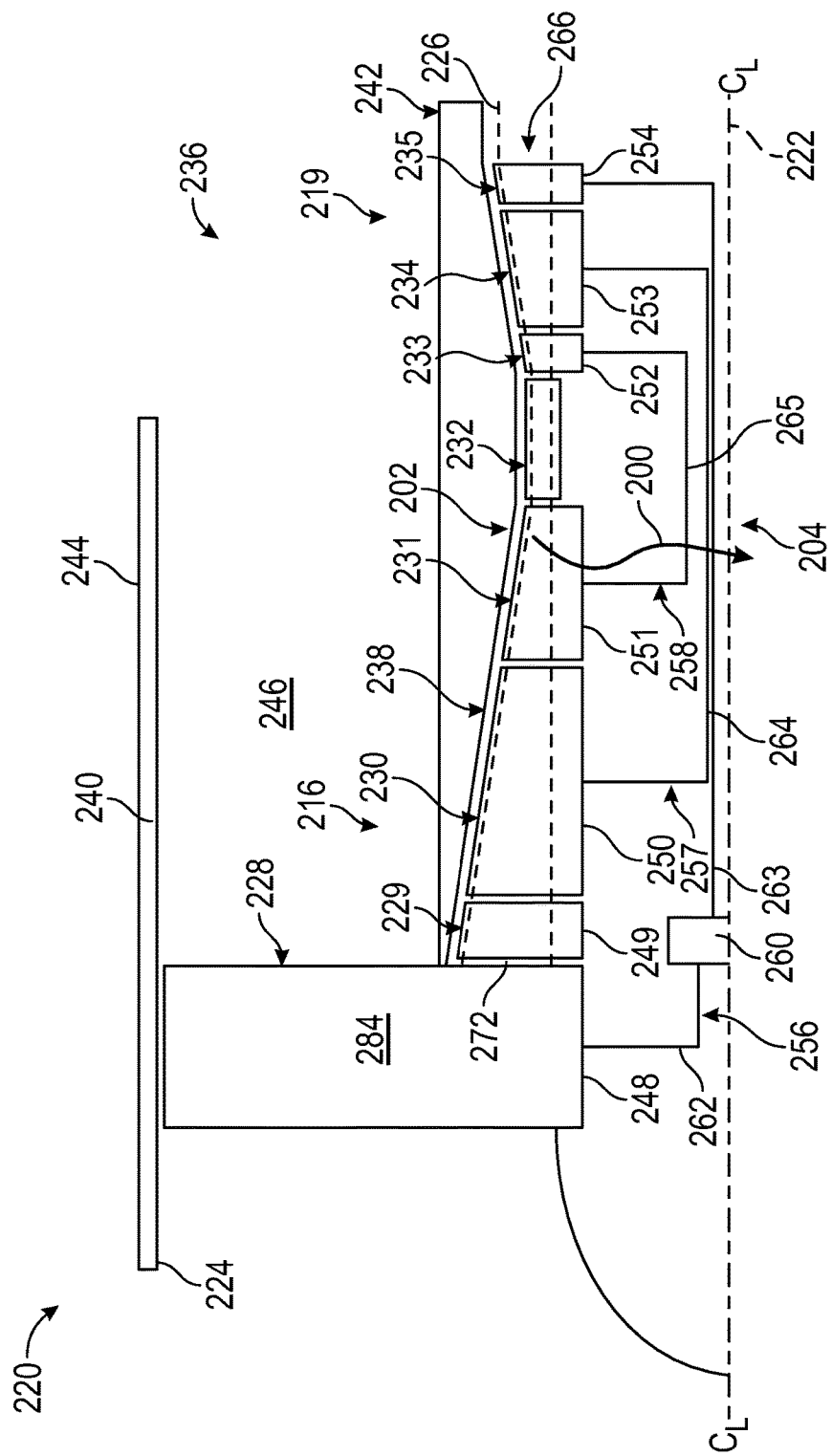
FIG. 2 is a partial schematic view of another example of a gas turbine engine.

FIG. 2 depicts another example of a gas turbine engine 220 in a geared turbofan configuration. The gas turbine engine 220 extends along an axial centerline 222 between an upstream airflow inlet 224 and a downstream airflow exhaust 226. The gas turbine engine 220 includes a fan section 228, a compressor section 216, a combustor section 232 and a turbine section 219. The compressor section 216 includes a low pressure compressor (LPC) section 229, an intermediate pressure compressor (IPC) section 230 and a high pressure compressor (HPC) section 231, where the LPC section 229 and IPC section 230 are lower pressure compressor section before the highest pressure compressor section of HPC section 231. The turbine section 219 includes a high pressure turbine (HPT) section 233, an intermediate pressure turbine (IPT) section 234 and a low pressure turbine (LPT) section 235.

The engine sections 228-235 are arranged sequentially along the centerline 222 within an engine housing 236. The engine housing 236 includes an inner (e.g., core) casing 238 and an outer (e.g., fan) casing 240. The inner casing 238 houses the LPC section 229 and the engine sections 230-235, which form a multi-spool core of the gas turbine engine 220. The outer casing 240 houses at least the fan section 228. The engine housing 236 also includes an inner (e.g., core) nacelle 242 and an outer (e.g., fan) nacelle 244. The inner nacelle 242 houses and provides an aerodynamic cover for the inner casing 238. The outer nacelle 244 houses and provides an aerodynamic cover the outer casing 240. The outer nacelle 244 also overlaps a portion of the inner nacelle 242 thereby defining a bypass gas path 246 radially between the nacelles 242 and 244. The bypass gas path 246, of course, may also be partially defined by the outer casing 240 and/or other components of the gas turbine engine 220.

Each of the engine sections 228-231 and 233-235 includes a respective rotor 248-254. Each of these rotors 248-254 includes a plurality of rotor blades (e.g., fan blades, compressor blades or turbine blades) arranged circumferentially around and connected to one or more respective rotor disks.

The rotor blades, for example, may be formed integral with or mechanically fastened, welded, brazed, adhered and/or otherwise attached to the respective rotor disk(s).

The rotors 248-254 are respectively configured into a plurality of rotating assemblies 256-258. The first rotating assembly 256 includes the fan rotor 248, the LPC rotor 249 and the LPT rotor 254. The first rotating assembly 256 can also include a gear train 260 and one or more shafts 262 and 263, which gear train 260 may be configured as an epicyclic gear train with a planetary or star gear system. The LPC rotor 249 is connected to the fan rotor 248. The fan rotor 248 is connected to the gear train 260 through the fan shaft 262. The LPC rotor 249 is therefore connected to the gear train 260 through the fan rotor 248 and the fan shaft 262. The gear train 260 is connected to and driven by the LPT rotor 254 through the low speed shaft 263.

The second rotating assembly 257 includes the IPC rotor 250 and the IPT rotor 253. The second rotating assembly 257 also includes an intermediate speed shaft 264. The IPC rotor 250 is connected to and driven by the IPT rotor 253 through the intermediate speed shaft 264.

The third rotating assembly 258 includes the HPC rotor 251 and the HPT rotor 252. The third rotating assembly 258 also includes a high speed shaft 265. The HPC rotor 251 is connected to and driven by the HPT rotor 252 through the high speed shaft 265.

One or more of the shafts 262-265 may be coaxial about the centerline 222. One or more of the shafts 263-265 may also be concentrically arranged. The low speed shaft 263 is disposed radially within and extends axially through the intermediate speed shaft 264. The intermediate speed shaft 264 is disposed radially within and extends axially through the high speed shaft 265. The shafts 262-265 are rotatably supported by a plurality of bearings; e.g., rolling element and/or thrust bearings. Each of these bearings is connected to the engine housing 236 (e.g., the inner casing 238) by at least one stationary structure such as, for example, an annular support strut.

During operation, air enters the gas turbine engine 220 through the airflow inlet 224. This air is directed through the fan section 228 and into a core gas path 266 and the bypass gas path 246. The core gas path 266 flows sequentially through the engine sections 229-235. The air within the core gas path 266 may be referred to as "core air". The air within the bypass gas path 246 may be referred to as "bypass air".

The core air is compressed by the compressor rotors 249-251 and directed into the combustor section 232. Fuel is injected into the combustor section 232 and mixed with the compressed core air to provide a fuel-air mixture. This fuel-air mixture is ignited and combustion products thereof flow through and sequentially cause the turbine rotors 252-254 to rotate. The rotation of the turbine rotors 252-254 respectively drive rotation of the compressor rotors 251-249 and, thus, compression of the air received from a core airflow inlet. The rotation of the turbine rotor 254 also drives rotation of the fan rotor 248, which propels bypass air through and out of the bypass gas path 246. The propulsion of the bypass air may account for a majority of thrust generated by the gas turbine engine 220, e.g., more than seventy-five percent (75%) of engine thrust. The gas turbine engine 220 of the present disclosure, however, is not limited to the foregoing exemplary thrust ratio. Further, although the example of FIG. 2 includes gear train 260, the gear train 260 can be eliminated in other embodiments that include two or more spools.

In embodiments with multiple nested shafts, such as the shafts 263-265 of FIG. 2, one or more heat pipe systems can be incorporated within an innermost shaft (i.e., shaft 263) to enhance thermal communication via a thermal communication path 200 from an upper portion 202 to a lower portion 204 of the HPC section 231, particularly in proximity to the combustor section 232. Various examples of heat pipe systems are depicted and further described in the examples of FIGS. 3-7.

Figure 3:
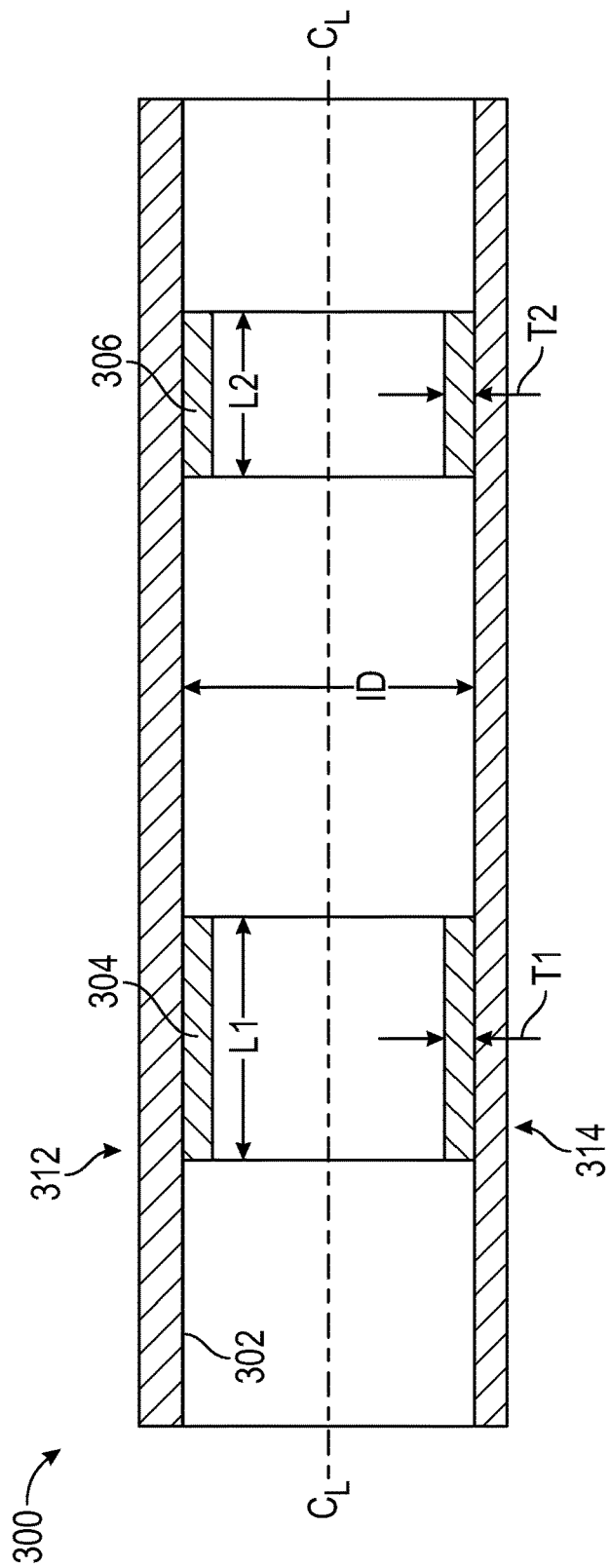
FIG. 3 depicts an inner wall of an engine rotor with heat pipe systems according to an embodiment.

FIG. 3 depicts an inner wall 302 of an engine rotor 300 with heat pipe systems 304, 306, such as within the low pressure shaft 30 of FIG. 1 and/or within the low speed shaft 263 of FIG. 2. The heat pipe systems 304, 306 conform to the inner wall 302 within a substantially annular envelope. In embodiments where the internal diameter (ID) of the inner wall 302 varies, the heat pipe systems 304, 306 can have differing diameters accordingly. The heat pipe systems 304, 306 can also have different axial lengths L1, L2 depending on the heat transfer needs and installation location relative to various engine components, e.g., compressor/combustor/turbine heat characteristics. Each of the heat pipe systems 304, 306 can be centered about a common centerline (CO but may vary in thickness T1, T2. Although two heat pipe systems 304, 306 are depicted in FIG. 3, it will be understood that embodiments can include one or more heat pipe systems 304, 306 positioned to reduce/prevent bowed rotor effects within an engine (e.g., gas turbine engine 10, 220 of FIGS. 1 and 2) after shutdown according to engine architecture, geometry, heat transfer characteristics, and/or other characteristics.

FIG. 4 depicts a portion of a heat pipe system 400 including arcuate heat pipe segments 402A, 402B conforming to the inner wall 302 of the engine rotor 300 of FIG. 3 according to an embodiment. The heat pipe system 400 can be bonded to the inner wall 302 of the engine rotor 300, for instance, by brazing, welding, integrally forming, and/or other coupling technique. The heat pipe system 400 is an example of either or both of heat pipe systems 304, 306 of FIG. 3. A heat pipe fluid 404 within the arcuate heat pipe segments 402A, 402B can be in an evaporated state during engine operation and transitions to at least a partially liquid state in response to temperature non-uniformity after engine shutdown. The heat pipe fluid 404 can be selected based on the anticipated performance characteristics and expected conditions at engine shutdown. For instance, the heat pipe fluid 404 can be Dowtherm, Ammonia, or other such fluids based on an anticipated temperature range of about 200 C to 1000 C at engine shutdown.

The efficient heat transfer within the heat pipe fluid 404 in an evaporator section 406A, 406B and a condenser section 408A, 408B efficiently establishes a thermal communication path 315 from an upper portion 312 (e.g., 12 o'clock position) and a lower portion 314 (e.g., 6 o'clock position) of an engine spool/rotor that may be positioned radially outward of the engine rotor 300, e.g., high pressure spool 33 of FIG. 1 or HPC rotor 251 of FIG. 2. The designation of the evaporator section 406A, 406B and the condenser section 408A, 408B can change relative to the rotational orientation of the arcuate heat pipe segments 402A, 402B. For instance, although one example orientation is depicted in FIG. 4, the evaporator section 406A, 406B may be defined in each of the sections of the arcuate heat pipe segments 402A, 402B in closest proximity to the upper portion 312 upon engine shutdown. Similarly, the condenser section 408A, 408B may be defined in each of the sections of the arcuate heat pipe segments 402A, 402B in closest proximity to the lower portion 314 upon engine shutdown.

Each of the arcuate heat pipe segments 402A, 402B can include a wicking structure 410 (partially depicted in arcuate heat pipe segment 402B) to passively guide the flow of the heat pipe fluid 404 (schematically depicted in arcuate heat pipe segment 402A), for instance, through capillary effects between respective condenser sections 408A, 408B and evaporator sections 406A, 406B. The wicking structure 410 can be substantially arcuate to match an internal volume of each of the arcuate heat pipe segments 402A, 402B. In the example of FIG. 4, the heat pipe fluid 404 is isolated in each of the arcuate heat pipe segments 402A, 402B.

To account for thermal growth, an expansion gap 412 can be formed between two ends of the one or more arcuate heat pipe segments 402A, 402B. Also, or alternatively, at least two ends 414 of the one or more arcuate heat pipe segments 402A, 402B can directly contact each other. Numerous other variations are contemplated in embodiments.

FIG. 5 depicts a heat pipe system 500 including arcuate heat pipe segments 502A, 502B, 502C, and 502D with thermally conductive interfaces 503 between at least two ends of the one or more arcuate heat pipe segments 502A-502D according to an embodiment. In the example of FIG. 5, a thermally conductive interface 503 is installed between arcuate heat pipe segments 502B and 502C, between 502C and 502D, and between 502D and 502A. However, not all ends of the arcuate heat pipe segments 502A-502D need to include thermally conductive interface 503, for instance, as depicted at interface 505 between arcuate heat pipe segments 502A and 502B. In other embodiments, a thermally conductive interface 503 is installed between arcuate heat pipe segments 502A and 502B. The thermally conductive interface 503 can be flexible to support thermal expansion while also providing a high degree of thermal conductivity. Similar to the example of FIG. 4, each of the arcuate heat pipe segments 502A-502D can include a wick structure 510 and the heat pipe fluid 404.

The heat pipe system 500 can be bonded to the inner wall 302 of the engine rotor 300 and is another example of either or both of heat pipe systems 304, 306 of FIG. 3. The heat pipe fluid 404 within the arcuate heat pipe segments 502A-502D can be in an evaporated state during engine operation and transitions to at least a partially liquid state in response to temperature non-uniformity after engine shutdown. Collectively, the heat pipe system 500 passively transfers heat from the upper portion 312 to the lower portion 314 of an engine spool/rotor that may be positioned radially outward of the engine rotor 300, e.g., high pressure spool 33 of FIG. 1 or HPC rotor 251 of FIG. 2. The use of additional arcuate heat pipe segments 502A-502D as compared to the arcuate heat pipe segments 402A, 402B of FIG. 4 can provide greater failure mode resiliency, e.g., better overall performance in the event of leakage of the heat pipe fluid 404 from a single arcuate heat pipe segment.

FIG. 6 depicts a heat pipe system 600 with arcuate heat pipe segments 602A, 602B with thermally conductive interfaces 503 according to an embodiment. In the example of FIG. 6, a thermally conductive interface 503 is installed between each end of the arcuate heat pipe segments 602A and 602B. Similar to the examples of FIGS. 4 and 5, each of the arcuate heat pipe segments 602A, 602B can include a wick structure 610 and the heat pipe fluid 404. The heat pipe system 600 can be bonded to the inner wall 302 of the engine rotor 300 and is another example of either or both of heat pipe systems 304, 306 of FIG. 3. The heat pipe fluid 404 within the arcuate heat pipe segments 602A, 602B can be in an evaporated state during engine operation and transitions to at least a partially liquid state in response to temperature non-uniformity after engine shutdown. Collectively, the heat pipe system 600 passively transfers heat from the upper portion 312 to the lower portion 314 of an engine spool/rotor that may be positioned radially outward of the engine rotor 300, e.g., high pressure spool 33 of FIG. 1 or HPC rotor 251 of FIG. 2.

FIG. 7 depicts a single arcuate heat pipe segment 702 conforming to the inner wall 302 of engine rotor 300 according to an embodiment. To account for thermal growth, an expansion gap 712 can be formed between each end of the arcuate heat pipe segment 702. Similar to the examples of FIGS. 4-6, the arcuate heat pipe segment 702 can include a wick structure 710 and the heat pipe fluid 404. The heat pipe system 700 is another example of either or both of heat pipe systems 304, 306 of FIG. 3. The heat pipe fluid 404 within the arcuate heat pipe segment 702 can be in an evaporated state during engine operation and transitions to at least a partially liquid state in response to temperature non-uniformity after engine shutdown. Collectively, the heat pipe system 700 passively transfers heat from the upper portion 312 to the lower portion 314 of an engine spool/rotor that may be positioned radially outward of the engine rotor 300, e.g., high pressure spool 33 of FIG. 1 or HPC rotor 251 of FIG. 2.

FIG. 8 is a flow chart illustrating a method 800 for bowed rotor reduction/prevention using a heat pipe system in accordance with an embodiment. The method 800 of FIG. 8 is described in reference to FIGS. 1-7 and may be performed with an alternate order and include additional steps.

At block 802, a heat pipe system is formed including one or more arcuate heat pipe segments shaped conforming to an inner wall of an engine rotor, such as heat pipe systems 304, 306, 400, 500, 600, 700 of FIGS. 3-7. The one or more arcuate heat pipe segments can each include a wick structure with a corresponding arcuate shape, such as wick structures 410, 510, 610, 710 within arcuate heat pipe segments 402, 502, 602, 702 of FIGS. 3-7 respectively. Each of the arcuate heat pipe segments 402, 502, 602, 702 can individually form a portion of a circular profile. The one or more arcuate heat pipe segments can be filled with a heat pipe fluid 404 that is in an evaporated state during engine operation and transitions to at least a partially liquid state in response to temperature non-uniformity after engine shutdown.

At block 804, the one or more arcuate heat pipe segments are bonded to the inner wall of the engine rotor, such as inner wall 302 of engine rotor 300 and may correspond to an inner diameter within the low pressure shaft 30 of FIG. 1 and/or within the low speed shaft 263 of FIG. 2, for example. The bonding can be performed using any known manufacturing/assembly process to couple the one or more arcuate heat pipe segments to the inner wall of the engine rotor. Each of the one or more arcuate heat pipe segments can be bonded in a position that extends axially along the inner wall of the engine rotor proximate to a high compressor engine section, such as proximate to the high pressure compressor 24 of FIG. 1 or the HPC section 231 of FIG. 2. In some embodiments, an expansion gap 412, 712 is formed between two ends of the one or more arcuate heat pipe segments. The expansion gap 412, 712 can be established by sizing of the one or more arcuate heat pipe segments and/or as part of the installation and bonding to the inner wall of the engine rotor. In some embodiments, at least two ends of the one or more arcuate heat pipe segments are positioned directly contact each other. A thermally conductive interface 503 can be formed between at least two ends of the one or more arcuate heat pipe segments in some embodiments. Multiple instances of heat pipe systems with varying diameter, length, thickness, and/or segmentation can be installed within the inner wall of the engine rotor of a same engine.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A heat pipe system comprising:
   one or more arcuate heat pipe segments shaped conforming to an inner wall of an engine rotor within an annular envelope and configured to communicate heat from an upper rotor portion to a lower rotor portion of a gas turbine engine after engine shutdown; and
   a heat pipe fluid within the one or more arcuate heat pipe segments.

2. The heat pipe system as in claim 1, wherein an expansion gap is formed between and external to two ends of the one or more arcuate heat pipe segments.

3. The heat pipe system as in claim 1, further comprising a thermally conductive interface between and external to at least two ends of the one or more arcuate heat pipe segments.

4. The heat pipe system as in claim 1, wherein the heat pipe system is bonded to the inner wall of the engine rotor within the annular envelope.

5. The heat pipe system as in claim 1, comprising a wicking structure that is arcuate within an internal volume of the one or more arcuate heat pipe segments, wherein the heat pipe fluid is in an evaporated state during engine operation and transitions to at least a partially liquid state in response to temperature non-uniformity after engine shutdown.

6. The heat pipe system as in claim 1, comprising at least two of arcuate heat pipe segments in the annular envelope, wherein a first two ends of the at least two arcuate heat pipe segments directly contact each other, an expansion gap or thermally conductive interface is formed between and external to a second two ends of the at least two arcuate heat pipe segments, and the heat pipe fluid is isolated in each of the at least two arcuate heat pipe segments.

7. The heat pipe system as in claim 1, wherein each of the one or more arcuate heat pipe segments extends axially along the inner wall of the engine rotor proximate to a high compressor engine section.

8. A gas turbine engine comprising:
   a high pressure spool comprising a high pressure compressor coupled to a high pressure turbine via a high pressure shaft;
   a low pressure spool comprising a low pressure compressor coupled to a low pressure turbine via a low pressure shaft concentrically arranged within the high pressure shaft; and
   a heat pipe system comprising one or more arcuate heat pipe segments shaped conforming to an inner wall of the low pressure shaft within an annular envelope, wherein a heat pipe fluid within the one or more arcuate heat pipe segments establishes a thermal communication path from an upper portion of the high pressure spool through the low pressure spool to a lower portion of the high pressure spool, and the heat pipe system is configured to communicate heat from the upper portion to the lower portion after engine shutdown.

9. The gas turbine engine as in claim 8, wherein an expansion gap is formed between and external to two ends of the one or more arcuate heat pipe segments.

10. The gas turbine engine as in claim 8, further comprising a thermally conductive interface between and external to at least two ends of the one or more arcuate heat pipe segments.

11. The gas turbine engine as in claim 8, wherein the heat pipe system is bonded to the inner wall of the low pressure shaft within the annular envelope.

12. The gas turbine engine as in claim 8, comprising a wicking structure that is arcuate within an internal volume of the one or more arcuate heat pipe segments, wherein the heat pipe fluid is in an evaporated state during engine operation and transitions to at least a partially liquid state in response to temperature non-uniformity after engine shutdown.

13. The gas turbine engine as in claim 8, comprising at least two of arcuate heat pipe segments in the annular envelope, wherein a first two ends of the at least two arcuate heat pipe segments directly contact each other, an expansion gap or thermally conductive interface is formed between and external to a second two ends of the at least two arcuate heat pipe segments, and the heat pipe fluid is isolated in each of the at least two arcuate heat pipe segments.

14. The gas turbine engine as in claim 8, wherein each of the one or more arcuate heat pipe segments extends axially along the inner wall of the low pressure shaft proximate to the high pressure compressor, and multiple instances of the heat pipe system have one or more different diameters, axial lengths, and thicknesses within the low pressure shaft.

15. A method comprising:
   forming a heat pipe system comprising one or more arcuate heat pipe segments shaped conforming to an inner wall of an engine rotor within an annular envelope, wherein the heat pipe system is configured to communicate heat from an upper rotor portion to a lower rotor portion of a gas turbine engine after engine shutdown; and
   bonding the one or more arcuate heat pipe segments to the inner wall of the engine rotor.

16. The method as in claim 15, further comprising forming an expansion gap between and external to two ends of the one or more arcuate heat pipe segments.

17. The method as in claim 15, further comprising forming a thermally conductive interface between and external to at least two ends of the one or more arcuate heat pipe segments.

18. The method as in claim 15, further comprising filling the one or more arcuate heat pipe segments with a heat pipe fluid that is in an evaporated state during engine operation and transitions to at least a partially liquid state in response to temperature non-uniformity after engine shutdown, wherein the heat pipe system comprises a wicking structure that is arcuate within an internal volume of the one or more arcuate heat pipe segments.

19. The method as in claim 15, wherein the heat pipe system comprises at least two of arcuate heat pipe segments in the annular envelope, the method further comprising positioning a first two ends of the at least two arcuate heat pipe segments directly contact each other, and wherein an expansion gap or thermally conductive interface is formed between and external to a second two ends of the at least two arcuate heat pipe segments, and the heat pipe fluid is isolated in each of the at least two arcuate heat pipe segments.

20. The method as in claim 15, wherein each of the one or more arcuate heat pipe segments extends axially along the inner wall of the engine rotor proximate to a high compressor engine section.

* * * * *